United States Patent
Bisdikian et al.

(10) Patent No.: US 9,614,735 B2
(45) Date of Patent: *Apr. 4, 2017

(54) BOUNDED-BUDGET MONITOR DEPLOYMENT IN MONITORING NETWORKS VIA END-TO-END PROBES

(71) Applicant: International Business Machines Corporation, Armonk, NY (US)

(72) Inventors: Chatschik Bisdikian, Chappaqua, NY (US); Ting He, Piermont, NY (US); Liang Ma, Armonk, NY (US); Bonnie K. Ray, Nyack, NY (US)

(73) Assignee: International Business Machines Corporation, Armonk, NY (US)

( * ) Notice: Subject to any disclaimer, the term of this patent is extended or adjusted under 35 U.S.C. 154(b) by 0 days.

This patent is subject to a terminal disclaimer.

(21) Appl. No.: 15/052,281

(22) Filed: Feb. 24, 2016

(65) Prior Publication Data

US 2016/0173341 A1  Jun. 16, 2016

Related U.S. Application Data

(63) Continuation of application No. 13/952,225, filed on Jul. 26, 2013, now Pat. No. 9,282,020.

(51) Int. Cl.
*H01R 31/08* (2006.01)
*H04J 1/16* (2006.01)
(Continued)

(52) U.S. Cl.
CPC ............ *H04L 41/145* (2013.01); *H04L 41/12* (2013.01); *H04L 43/0876* (2013.01);
(Continued)

(58) Field of Classification Search
CPC ..................................................... H04L 43/12
See application file for complete search history.

(56) References Cited

U.S. PATENT DOCUMENTS 9,282,020 B2 * 3/2016 Bisdikian ................ H04L 43/12

FOREIGN PATENT DOCUMENTS

| EP | 1244248 A1 | 9/2002 |
|---|---|---|
| EP | 1505768 A2 | 2/2005 |
| EP | 1169859 B1 | 4/2007 |

OTHER PUBLICATIONS

Liang et al. (Topological conditions for identifying additive link metrics via end to end path measurements, Technical report, Jul. 2012, pp. 1-9).*

(Continued)

*Primary Examiner* — Maharishi Khirodhar
(74) *Attorney, Agent, or Firm* — Scully, Scott, Murphy & Presser, P.C.; Mercedes L. Hobson, Esq.

(57) ABSTRACT

A method, computer storage medium, computer system of performing monitor deployment under budget constraints includes obtaining a network topology and a deployment budget, decomposing the network topology into a plurality of components having a predetermined property, computing a benefit and a cost for identifying each of the components, selecting at least one targeted component based on a ratio of the benefit to the cost for identifying each of the components, and deploying monitors to identify links in the at least one targeted component within a remaining portion of the deployment budget.

14 Claims, 15 Drawing Sheets

(51) Int. Cl.
    *H04L 12/24*    (2006.01)
    *H04L 12/26*    (2006.01)
(52) U.S. Cl.
    CPC .............. *H04L 43/12* (2013.01); *H04L 43/50* (2013.01); *H04L 41/0826* (2013.01); *H04L 43/10* (2013.01)

(56) References Cited

OTHER PUBLICATIONS

Sava et al. (Distributed Hierarchical monitoring and alarm management in transparent optical networks, IEEE, 2008, pp. 5281-5285).*
Duffield, N.G. et al., "Multicast Inference of Packet Delay Variance at Interior Network Links", IEEE Infocom, (2000), pp. 1351-1360.
Satyajeet Ahuja et al., (IEEE, Single-Link Failure Detection in All Optical Networks Using Monitoring Cycles and Paths, Aug. 2009).
Sava Stanic et al. (IEEE, Distributed Hierarichical Monitoring and Alarm Management in Transparent Optical Networks, May 19-23, 2008).
Antonio Liott et al. (IEEE, Exploiting Agent Mobility for Large scale Network Monitoring, May/Jun. 2002).
Kyoungwon Suh et al. (Science direct, Locating Network monitors: Complexity, heuristicts and coverage, Aug. 25, 2005).
Jain, N. et al.; "Self-tuning, bandwidth-aware monitoring for dynamic data strems"; 2009 IEEE 25th International Conference on Data Engineering, Mar.-Apr. 2009, pp. 114-125.
Rad, MM. et al., "Probing the limits of PON Monitoring Using Periodic Coding Technology", Journal of Lightwave Technology, May 1, 2011, pp. 1375-1382, vol. 29, No. 9.
Jamerson, MA.; "Cost Minimization in Computer Systems Subject to Multiple Memory Constraints", IP.com, Apr. 22, 2007.
Speiser, A., "Advanced Project Management Cost Optimization", IBM Technical Disclosure Bulletin, May 1, 1992, pp. 61-64, vol. 34, No. 12.
IBM; "Optimical test suite generation subject to time and cost constraints", IP.com, Oct. 7, 2003.
Lo Presti et al., "Multicast-Based Interference of Network-Internal Delay Distributions", IEEE/ACM Transactions on Networking, Dec. 6, 2002, pp. 761-775, vol. 10, No. 6.
Xia, Y. et al., Interference of Link Delay in Communication Networks, IEE Journal on Selected Areas in Communications, Dec. 2006, pp. 2235-2248, vol. 24, No. 12.
Chen, Y. et al., "An Algebraic Approach to Practical Scalable Overlay network Monitoring", SIGCOMM 2004, Aug. 30-Sep. 3, 2004, Portland OR.
Ahuja, S. et al., "SRLG Failure Localization in All-Optical Networks Using Monitoring Cycles and Paths," IEEE Communications Society, 2008.
Gopalan, A. et al., "On Identifying Additive Link Metrics Using Linearly Independent Cycles and Paths", Accepted for Publication in IEEE/ACM Transactions on Network, 2011, vol. PP, No. 99.
Kumar, R. et al., "Practical Beacon Placement for Link Monitoring Using Network Tomography", IEEE JSAC-Sampling, 2006.
Breitbart, Y., et al., "Effective Monitor Placement in Internet Networks", Journal of Networks, Sep. 2009, pp. 657-666, vol. 4, No. 7.
Ma, L., et al., "Topological Conditions for Identifying Additive Link Metrics via End-to-end Path Measurements", Technical Report, Jul. 2012, Dept. of EEE, Imperial College, London, UK.
Gu, Y. et al., "Optimal probing for unicast network delay tomography", INFOCOM, 2010, NEC Laboratories American, Inc.
Xi, B. et al., "Estimating Network Loss Rates Using Active Tomography", Journal of the American Statistical Assocation, Dec. 2006, pp. 1430-1448, vol. 101, No. 476.
Hopcroft, J. et al., "Dividing a Graph Into Triconnected Components", Sep. 1973, pp. 135-158, vol. 2, No. 3.
Ma, L. et al., "Efficient Identification of Additive Link Metrics via Network Tomography", Distributed Computing Systems (ICDCS), 2013 IEEE 33rd International Conference Jul. 8-11, 2013, pp. 581-590.
http://www.cs.washington.edu/research/networking/rocketfuel/interactive/7018us.html, printed Sep. 10, 2014.
Notice of Allowance dated Nov. 13, 2015 issued in U.S. Appl. No. 13/952,225.
Ex Parte Quayle dated Jul. 30, 2015 issued in U.S. Appl. No. 13/952,225.
Office Action dated Feb. 6, 2015 issued in U.S. Appl. No. 13/952,225.

\* cited by examiner

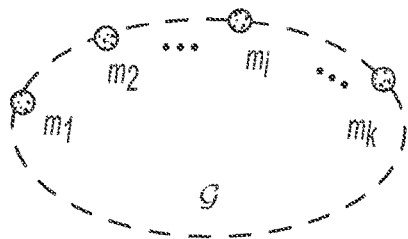
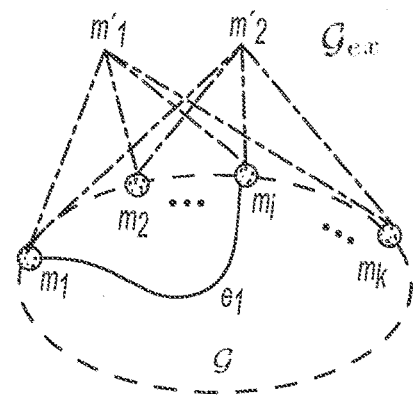
FIG. 4A
(Prior Art)
FIG. 4B
(Prior Art)

BOUNDED-BUDGET MONITOR DEPLOYMENT IN MONITORING NETWORKS VIA END-TO-END PROBES

CROSS REFERENCE TO RELATED APPLICATION

The present application is a continuation application of U.S. Ser. No. 13/952,225 filed Jul. 26, 2013, the entire contents of which are incorporated herein by reference.

This invention was made with Government support under Contract No.: W911NF-06-3-0001 awarded by U.S. ARMY. The Government has certain rights in this invention.

BACKGROUND

Accurate and efficient monitoring of network internal states (e.g., delays and loss rates on individual links) is important for various network operations such as network planning, routing reselection, resource allocation, and fault diagnosis. Various conventional techniques (e.g., Tivoli Netcool and Network Manager) typically rely on directly measuring the metrics of interest through local monitoring agents running on internal nodes. Such direct measurement is typically most applicable to tightly integrated networks (e.g., enterprise networks, data center). FIG. 1 shows an example of such direct measurement in connection with network 100. In particular, this FIG. 1 shows direct measurement carried out from each of servers E, F, G and H.

Loosely integrated networks (e.g., Internet, third-party networks, legacy networks and smart city networks) typically require a different approach as (all or part of) the network internal states are not directly accessible by the monitoring system. This second approach is network tomography.

Network tomography (see, L F. Lo Presti, N. Duffield, J. Horowitz, and D. Towsley, "Multicast-based inference of network-internal delay distributions," IEEE/ACM Trans. Networking, 2002) provides a light-weight alternative. Network tomography aims at inferring internal link metrics from externally measurable end-to-end path metrics between monitors. Measurement is collected by sending probe packets from a source monitor to a destination monitor along a selected path. The link metrics involved in this path are accordingly measured as a sum path metric at the destination monitor. Combining all possible path measurements, network tomography is essentially an inverse problem with the purpose of reconstructing the link level information based on their accumulated performance in the corresponding monitor-to-monitor paths.

FIG. 2 shows an example of such network tomography in connection with network 200. As seen in this FIG. 2, network tomography provides for inferring internal link/path metrics from external probes between vantage points or monitors (e.g., servers E/H and G/F).

However, network tomography conventionally has certain limitations. For example, one goal is to infer network internal state (e.g., link metrics) from external observation (e.g., external-to-external probes). This may be attempted via inverting the measurement matrix (see FIG. 3 showing an example network and matrix). However, a pitfall is that such a matrix is not always invertible (rank deficient) and monitor placement is important. In this regard, although the number of paths is much larger than the number of links, most paths (all except at most n paths, n being the number of links) are linearly dependent, thus essentially providing no new information. Accordingly, one question is how to place monitors to make the metric invertible?

Various conventional solutions in monitor deployment focus on complete link identification. Specifically, R. Kumar and J. Kaur, "Practical beacon placement for link monitoring using network tomography," JSAC, 2006 and Y. Breitbart, F. F. Dragan, and H. Gobjuka, "Effective monitor placement in Internet networks," Journal of Networks, vol. 4, no. 7, 2009 try to minimize the number of required monitors; however, internal support (ICMP (Internet Control Message Protocol)) must be available in R. Kumar and J. Kaur, "Practical beacon placement for link monitoring using network tomography," JSAC, 2006 and all link metrics are assumed to be binary in Y. Breitbart, F. F. Dragan, and H. Gobjuka, "Effective monitor placement in Internet networks," Journal of Networks, vol. 4, no. 7, 2009. In recent work (L. Ma, T. He, K. K. Leung, D. Towsley, and A. Swami, "Topological conditions for identifying additive link metrics via end-to-end path measurements," submitted to INFOCOM 2013), an optimal monitor deployment algorithm is developed that uses the minimum number of monitors to identify all link metrics under an arbitrary network topology.

Referring now to FIG. 4A showing a basic network and FIG. 4B showing an extended network, a further discussion will now be made with respect to minimum deployment for complete identification (in this example, the "basic network" is the original topology of the network under consideration as illustrated in FIG. 4A and the "extended network" is the original topology plus added virtual monitors and links as illustrated in FIG. 4A). In this regard, "Topological conditions for identifying additive link metrics via end-to-end path measurements," L. Ma, T. He, K. K. Leung, D. Towsley, and A. Swami had established "iff" conditions (that is, necessary and sufficient conditions) on monitor placement for unique link identification (i.e., computation of link metrics) using cycle-free probes. Still referring to FIGS. 4A and 4B, this process uses at least 3 monitors and the extended network must be 3-vertex-connected.

That is, the conditions imply that each bi/triconnected component (see the network 500 of FIG. 5) of FIG. 5) needs ≥3 "monitors" (cutvertices/monitors). This results in the minimum deployment for complete identification. In use, the minimum number monitors needed can be large (for example, an ATT network of backbone and access routers (see, http://www.cs.washington.edu/research/networking/rocketfuel/interactive/7018us.html) may need 88 monitors 108 nodes). Further, here is a question of how to place monitors to minimize uncertainty in network state under limited budget? In practical deployment, network operators may have a limited budget for monitor deployment. Moreover, not all internal links are equally important to monitor. Therefore, in various embodiments techniques to selectively deploy monitors are provided (e.g., to identify high-value states while minimizing uncertainty on the rest).

SUMMARY

The present disclosure relates generally to the field of bounded-budget monitor deployment in monitoring networks via end-to-end probes.

In various embodiments, methodologies may be provided that automatically perform bounded-budget monitor deployment in monitoring networks via end-to-end probes.

In one embodiment, a method of selective monitor deployment under budget constraints is provided, the method comprising: obtaining a network topology, a structure of an overlay network having a plurality of layers of monitoring interest, and a deployment budget; and from a top layer of the overlay network towards a bottom layer of the overlay network: computing a minimum deployment cost to fully identify links in a current layer of the overlay network; if the computed minimum deployment cost is no more than a remaining portion of the deployment budget: then deploying monitors so that the current layer of the overlay network is identified with the minimum deployment cost, reducing the remaining portion of the deployment budget, and going to the next layer; otherwise, deploying monitors within the remaining portion of the deployment budget so as to identify a fraction of link metrics of the current layer of the overlay network.

In another embodiment, a method of selective monitor deployment under budget constraints is provided, the method comprising: obtaining a network topology and a deployment budget; decomposing the network topology into a plurality of components having a predetermined property; computing a benefit and a cost for identifying each of the components; selecting at least one targeted component based on the benefit and the cost for identifying each of the components; and deploying monitors to identify links in the at least one targeted component within a remaining portion of the deployment budget.

In another embodiment, a computer readable storage medium, tangibly embodying a program of instructions executable by the computer for selective monitor deployment under budget constraints is provided, the program of instructions, when executing, performing the following steps: obtaining a network topology, a structure of an overlay network having a plurality of layers of monitoring interest, and a deployment budget; and from a top layer of the overlay network towards a bottom layer of the overlay network: computing a minimum deployment cost to fully identify links in a current layer of the overlay network; if the computed minimum deployment cost is no more than a remaining portion of the deployment budget: then deploying monitors so that the current layer of the overlay network is identified with the minimum deployment cost, reducing the remaining portion of the deployment budget, and going to the next layer; otherwise, deploying monitors within the remaining portion of the deployment budget so as to identify a fraction of link metrics of the overlay network.

In another embodiment, a computer readable storage medium, tangibly embodying a program of instructions executable by the computer for selective monitor deployment under budget constraints is provided, the program of instructions, when executing, performing the following steps: obtaining a network topology and a deployment budget; decomposing the network topology into a plurality of components having a predetermined property; computing a benefit and a cost for identifying each of the components; selecting at least one targeted component based on the benefit and the cost for identifying each of the components; and deploying monitors to identify links in the at least one targeted component within a remaining portion of the deployment budget.

BRIEF DESCRIPTION OF THE DRAWINGS

Various objects, features and advantages of the present invention will become apparent to one skilled in the art, in view of the following detailed description taken in combination with the attached drawings, in which:

FIGS. 4A and 4B depict examples of a basic network and an extended network, respectively, with respect to minimum deployment for complete identification.

DETAILED DESCRIPTION

Figure 1:
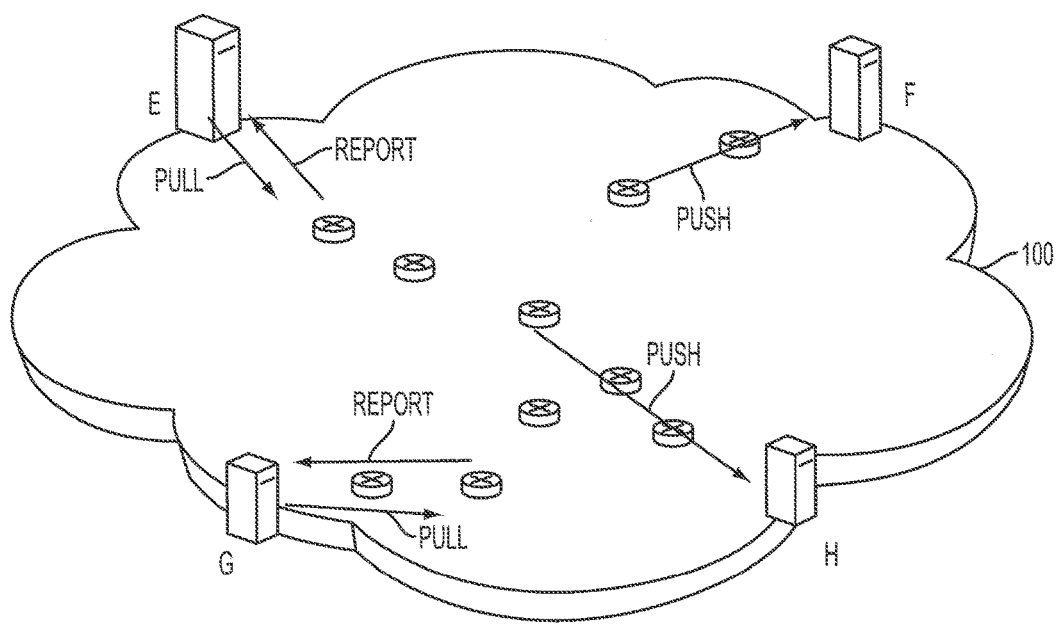
FIG. 1 depicts an example of direct measurement in connection with network 100.
Figure 2:
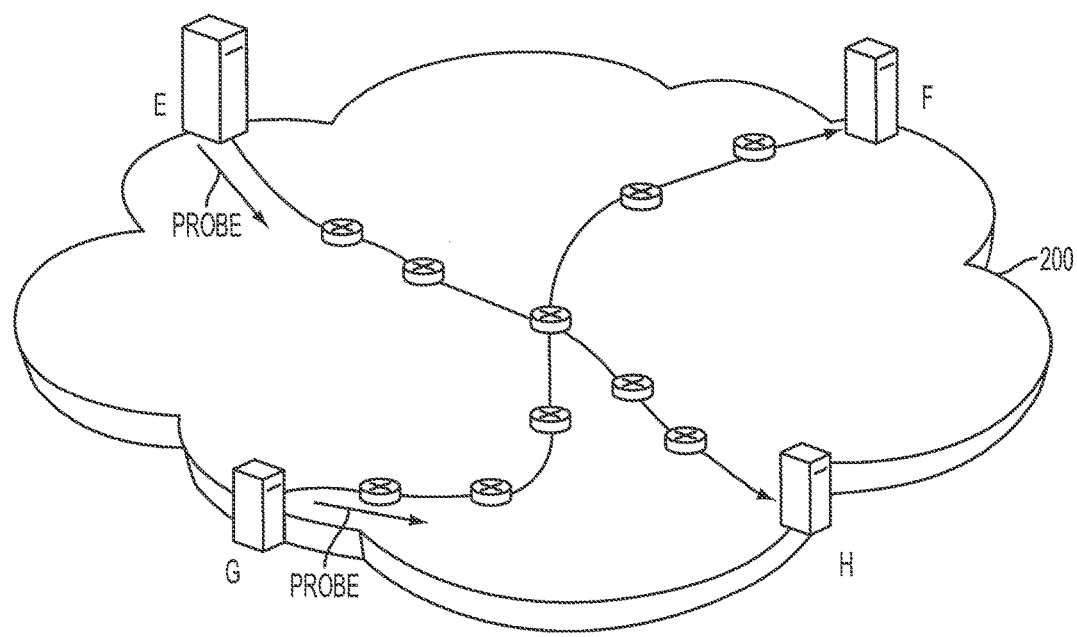
FIG. 2 depicts an example of network tomography in connection with network 200.
Figure 3:
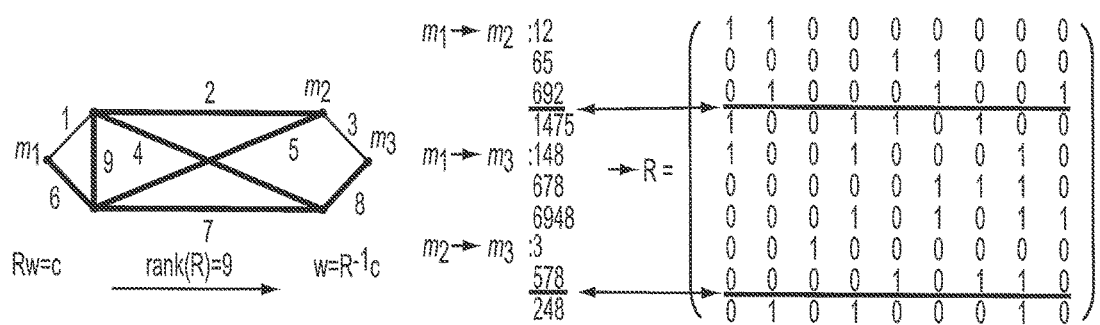
FIG. 3 depicts an example a network and matrix in connection with network tomography.
Figure 5:
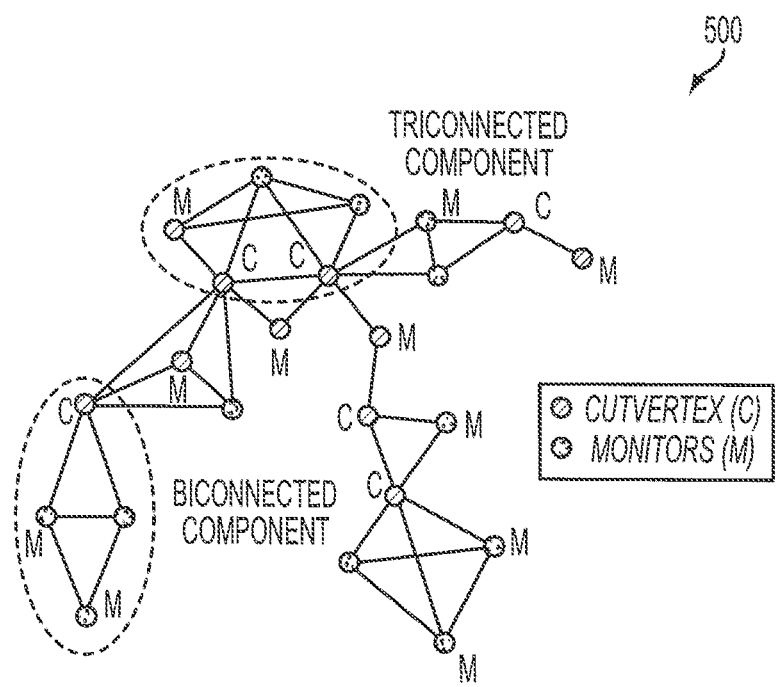
FIG. 5 depicts an example of bi/triconnected components in connection with network 500.

As described herein, performing bounded-budget monitor deployment in monitoring networks via end-to-end probes may be implemented in the form of systems, methods and/or algorithms.

For the purposes of describing and claiming the present invention the term "monitor" is intended to refer to software and/or hardware agent(s) co-located with a monitored network element capable of generating probes, collecting performance metrics of interest from probes, and reporting collected measurements to a central monitoring station.

For the purposes of describing and claiming the present invention the term "multi-resolution network monitoring" is intended to refer to flexible outcomes of the monitoring operation, where each outcome may correspond to performances at one or multiple network elements. The "resolution" is said to be higher if each outcome corresponds to fewer network elements.

For the purposes of describing and claiming the present invention the term "cutvertex" is intended to refer to a node, removal of which will disconnect the network.

Reference will now be made to various embodiments of selective monitor deployment under budget constraint. These embodiments make use of the observation that tomography naturally gives aggregate information. Thus, in various examples, mechanisms are provided to partition the network to achieve partial identifiability.

As described herein in a first embodiment a method of selective monitor deployment under budget constraints for multi-resolution network monitoring using end-to-end probes between monitors is provided, the method comprising: (1) obtaining a network topology, a structure of a plurality of layers of an overlay network of monitoring interest, and a deployment budget as an input; (2) from the top layer of the overlay network towards the bottom layer of the overlay network: (2.1) compute the minimum deployment cost to fully identify links in the current layer of overlay network; (2.2) if the cost is no more than the remaining budget, then deploy monitors so that the current level of overlay network is identified with the minimum cost, and go to the next layer; (2.3) otherwise, deploy monitors within the remaining budget so as to identify a fraction of link metrics of the overlay network.

In one example, in step (1) above, the input only contains an original topology of the network and there is a preprocessing step to partition the network into a plurality of overlay network layers.

In another example, in step (1) above, the input includes additional information of cost at each deployment location and weights of each targeted (overlay network) link.

In another example, in step (2.3) above, the method of deploying monitors for identifying part of the overlay network is the minimum-uncertainty deployment method described herein.

In another example, in step (2) above, the method iterates through each layer multiple times, where deployment in a lower layer may result in recommending adjustments of the deployment in an upper layer so as to reduce the overall deployment cost. One specific example of recommending adjustments may be as follows: When step (2.1) computes the minimum-cost deployment for the current layer of overlay network, it is unaware of further monitor deployments in lower layers (as the iteration goes from higher layer to lower layer). If the iteration is repeated more than once, step (2.1) in subsequent iterations will (in this example) only deploy necessary monitors given all monitors deployed in layers above and below the current layer, and hence may save deployment cost.

As described herein in a second embodiment a method of selective monitor deployment under budget constraints for minimum-uncertainty network monitoring using end-to-end probes between monitors is provided, the method comprising: (1) obtaining a network topology and a deployment budget as an input; (2) decomposing the network into components subject to (i.e., such that each component satisfies) a certain property; (3) computing a benefit and a cost for identifying each component; (4) selecting at least one targeted component based on the benefit and cost within budget constraint, and (5) deploying monitors to identify links in the selected component(s) within the budget constraint (e.g., with minimum cost).

In one example, in step (1) above, the obtained network topology is the topology of the first layer (of an overlay network) that is not fully identifiable and the budget is a residual budget after deployment at higher layer(s).

In another example, in step (1) above, the input contains additional information including existing monitor deployment, cost of each deployment location, and weight of each targeted (overlay network) link.

In another example, in step (2) above, the property is that each component is independently identifiable with the least possible deployment cost.

In another example, in step (2) above, the property is that each component is a triconnected component of the original network.

In another example, in step (3) above, the benefit is measured by the total number of links in a given component.

In another example, in step (3) above, the benefit is measured by the total weight of links in a given component (e.g., if link weights are specified in the input).

In another example, in step (3) above, the cost is measured by the deployment cost (e.g., minimum deployment cost) for identifying all links in a given component.

In another example, in step (4) above, the component with the highest benefit-cost ratio is selected.

In another example, in step (4) above, jointly select multiple components to maximize the number/weight of their links subject to the following: that the minimum deployment cost of identifying all of them is within the budget.

In another example, in step (4) above, select portions of at least one component to identify if the remaining budget is not sufficient to identify entire component(s).

In another example, in step (4) above, select the interior of at least one component that can be identified within a remaining budget to maximize the benefit of the interior links.

In another example, step (5) above further comprises deploying monitors to identify all links in the selected component(s) with the minimum deployment cost.

In another example, step (5) above further comprises updating the cost of neighboring components of the selected component(s) by considering their connecting points with the selected component(s) as monitors (it is proven that the set of identifiable links remain the same regardless of whether the connecting points to another component (i.e., nodes belonging to both components) are real monitors or not, as long as the other component has at least one monitor; this implies once monitors have been placed in one component, its connecting points to other components are effectively new monitors for those components).

In another example, after step (5) above, repeat steps 4-5 until reaching the deployment budget.

Figure 6:
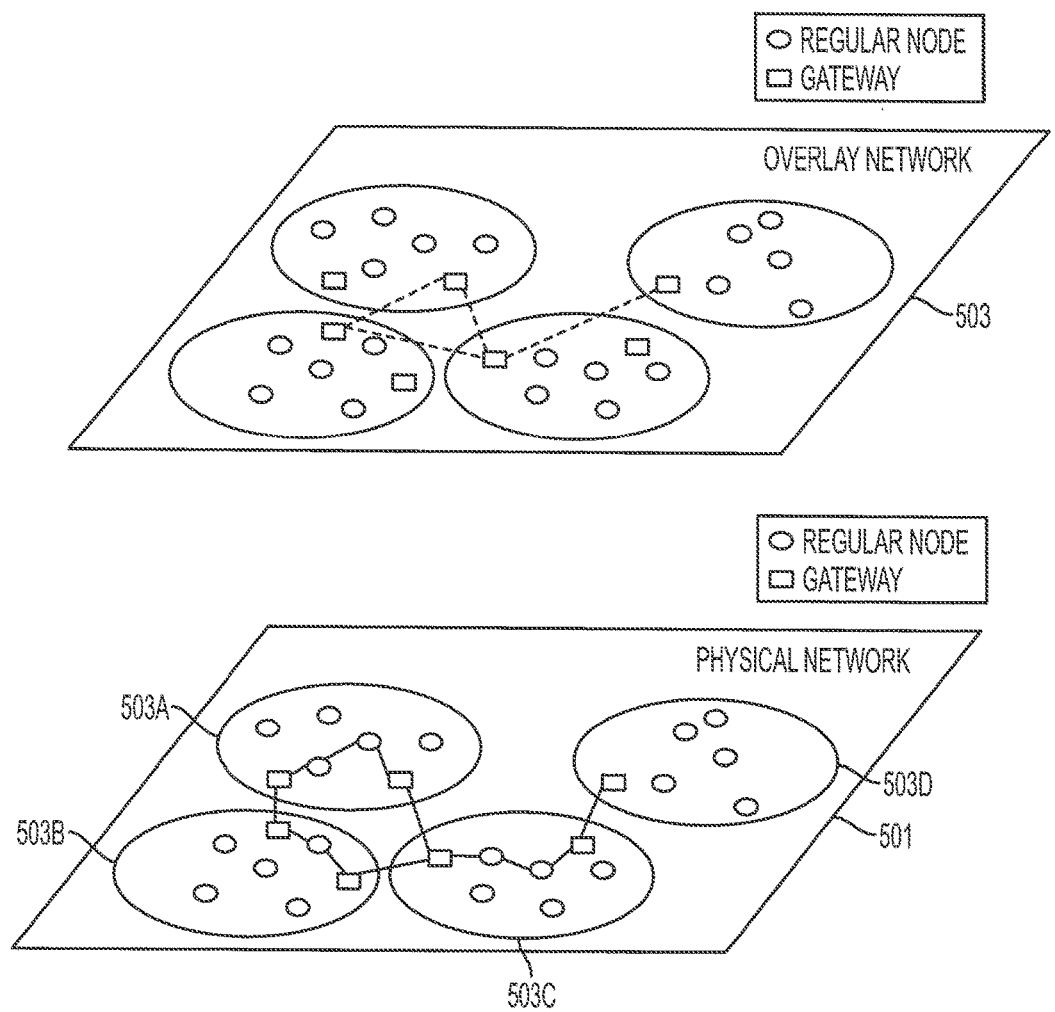
FIG. 6 depicts an example of physical network 501 and a single overlay network layer 503 according to an embodiment of the present invention.

Referring now to FIG. 6, in the first embodiment mechanisms are provided to selectively deploy monitors at nodes in different levels of a network (e.g., different levels of one or more overlay networks) to identify internal states at different resolutions (that is, vertical partition). Further, mechanisms are provided to maximize resolution within budget. In the example of this FIG. 6, there is physical network 501 and a single overlay network layer 503 (of course, while one layer of the overlay network is shown in this example, any number of layers and/or any number of overlay networks may be used).

Figure 7:
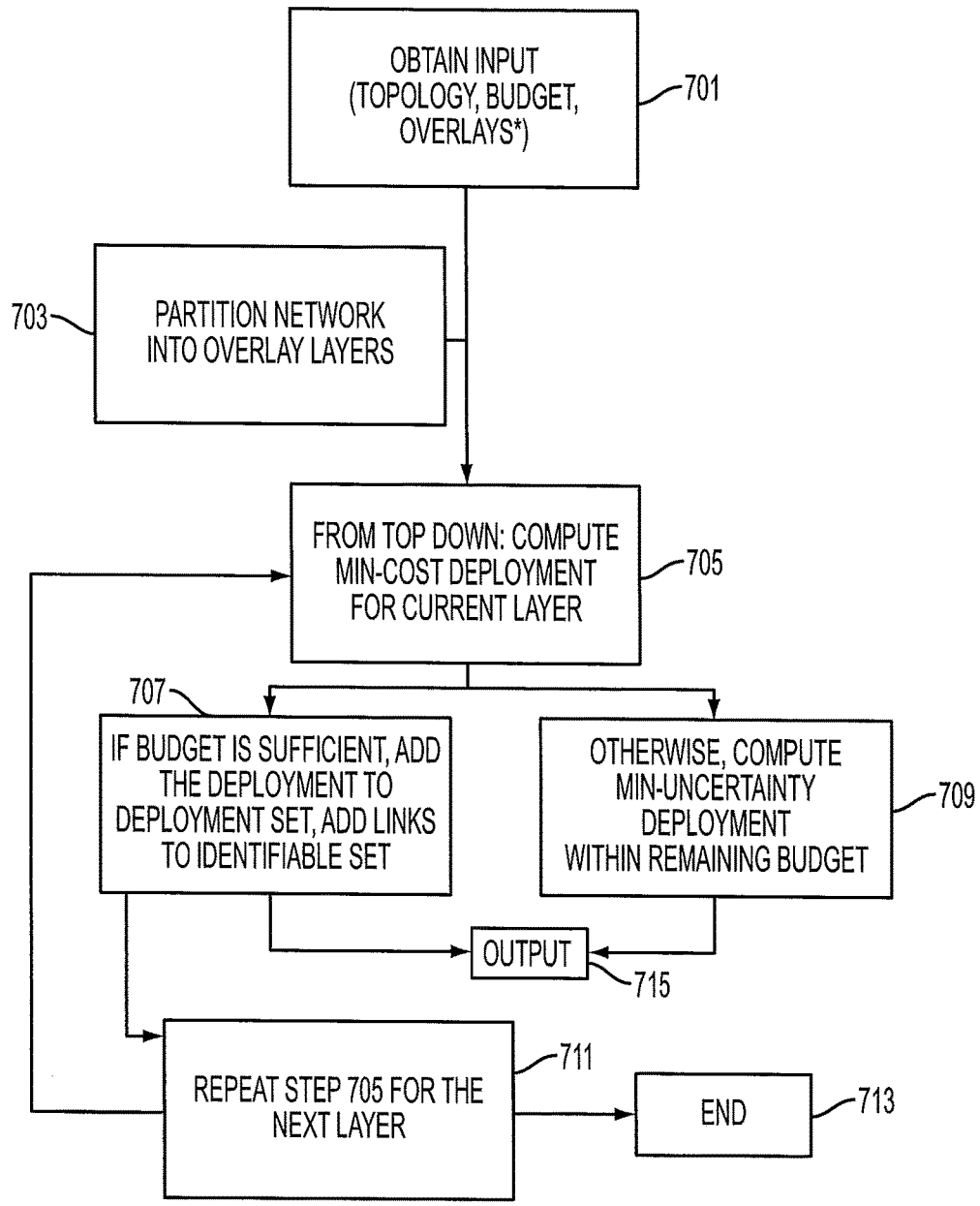
FIG. 7 depicts a block diagram of a method of multi-resolution monitor deployment according to an embodiment of the present invention.

FIG. 7 depicts a block diagram of a method of multi-resolution monitor deployment according to the first embodiment. At step 701 the input is obtained. In this example the input comprises: network topology, overlay network topology (optional) and deployment budget (e.g., number of monitors). If the overlay network topology is obtained as part of the input, the process continues to step 705. If the overlay network topology is not obtained as part of the input, step 703 is used to partition the network into one or more layers of the overlay network (in this case, the process would likewise then continue to step 705). At step 705 a minimum cost deployment is computed in a top down manner (that is, from an overlay network layer furthest from the physical network layer in a direction down towards the physical network layer; in other words—from the highest-level overlay network towards the physical network, where a higher-level overlay network is an abstraction of a lower-level overlay network (the lowest level being the physical network) with each overlay node representing a collection of connected nodes and each overlay link representing a path.) for each overlay network layer. In other words, an iterative process is performed (from step 705 to step 707/709 onward) for each of a "current" overlay network layer.

Still referring to FIG. 7, it is seen that after step 705 a decision is made. If the budget is sufficient, the minimum cost deployment from step 705 is added a deployment set, and the associated links are added to an identifiable set. If the budget is not sufficient, step 709 is carried out to compute the minimum uncertainty deployment within the remaining budget (this computation of step 709 will be discussed in more detail below with reference to FIG. 8).

Still referring to FIG. 7, it is seen that after step 707 the process is repeated for the next layer (unless the current layer is the last layer, in which case the process ends at step 713). In addition, an output at step 715 comprises a set of deployment locations and a set of identifiable path segments/links (in one example, the output may be made after each layer is processed; in another example, the output may be made after all layers are processed).

Still referring to FIG. 7, it is noted that since the resolution of layer i+1 is higher than that of layer i, all nodes in layer i are visible in layer i+1. Thus, monitors in layer i are also usable in layer i+1. In FIG. 7, step 703 is optional depending on the design of the overlay network (e.g., no partitioning is done if the overlay network has only one layer (that is, is the same as the original network). Following the direction from the top layer to the bottom layer, step 705 computes the minimum monitor requirement (see Minimum Monitor Placement ("MMP") algorithm in L. Ma, T. He, K. K. Leung, D. Towsley, and A. Swami, "Topological conditions for identifying additive link metrics via end-to-end path measurements," submitted to INFOCOM 2013) and the corresponding placement for identifying all logical links in the current layer. If the remaining budget is sufficient (step 707), then add the monitor deployment computed by MMP and the logical links to the deployment set and identifiable set, respectively, and afterwards repeat step 705 with respect to the next layer (step 711) to achieve a better resolution; otherwise, using the minimum-uncertainty deployment algorithm (discussed herein) to identify as many links as possible in the current layer (step 709).

Figure 8:
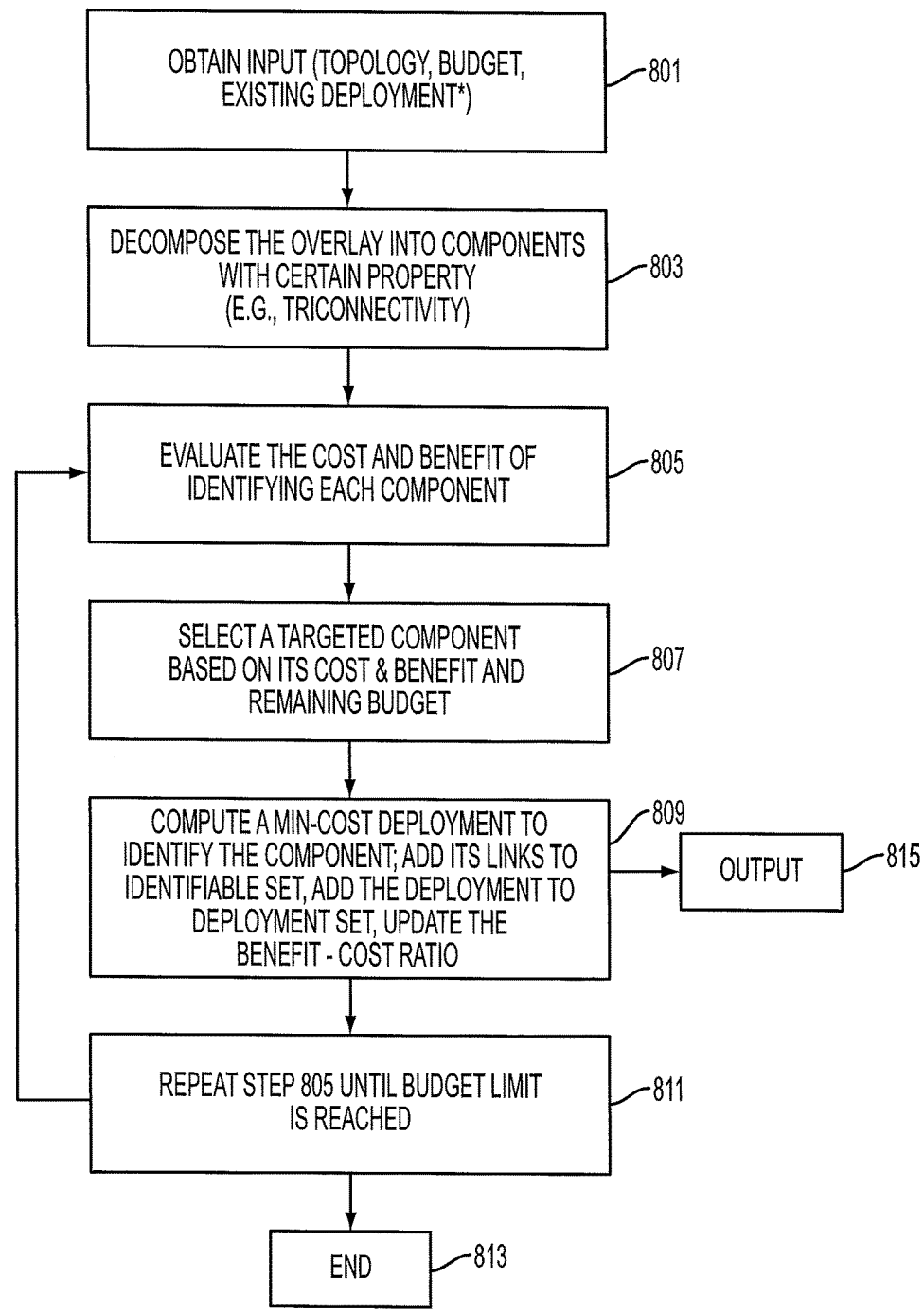
FIG. 8 depicts a flow diagram of a method of minimum-uncertainty monitor deployment according to an embodiment of the present invention.

Referring now to FIG. 8 (showing an example of the second embodiment), more detail regarding step 709 (a method of computing minimum-uncertainty monitor deployment) is provided. As seen in this FIG., step 801 is to obtain input (topology, budget and existing deployment (optional)). Step 803 is to decompose the overlay network into components with a certain property (e.g., triconnectivity). Step 805 is to evaluate the cost and benefit of identifying each component. Step 807 is to select a targeted component based on its cost and benefit and remaining budget. Step 809 is to compute a minimum-cost deployment to identify the component; add the identified component's links to the identifiable set; add the deployment to the deployment set; and update a benefit-cost ratio. After step 811 the process is repeated until the budget limit is reached (after the budget limit is reached the process ends at step 813).

In addition, an output at step 815 comprises the identifiable set; the deployment set; and the updated benefit-cost ratio (in one example, the output may be made after each iteration; in another example, the output may be made after all iterations).

Still referring to FIG. 8, additional detail regarding an algorithm of minimum-uncertainty deployment in layer i ($1 \leq i \leq k$, k is the number of layers) is shown, where the input topology is the topology in the current layer. Step 803 decomposes the input topology into subgraphs of a certain property. One example property is that each decomposed subgraph is a triconnected component (a maximal 3-vertex-connected subgraph) (see, J. E. Hoperoft and R. E. Tarjan, "Dividing a graph into triconnected components," SIAM Journal on Computing, vol. 2, pp. 135-158, 1973.), because 3-vertex-connectivity is sufficient to identify all involved link metrics using 3 arbitrary monitors (see L. Ma, T. He, K. K. Leung, D. Towsley, and A. Swami, "Topological conditions for identifying additive link metrics via end-to-end path measurements," submitted to INFOCOM 2013), i.e., selecting any 3 nodes in a 3-vertex-connected network as monitors can guarantee the identifiability of all link metrics. Step 805 evaluates the benefit and cost for identifying each component. One example of the benefit is the increased number of identifiable links, i.e., the number of links in the corresponding component (in the current layer of overlay network). Another example of the benefit is the total weight of identifiable links in this component, where each link is associated with a weight indicating the importance of knowing this link metric. For cost, one example is the required number of monitors to identify all links in this component, and another example is the total deployment cost in doing the same, where each node is associated with a cost to deploy a monitor at the node. Based on the calculated benefit and cost of all components (step 805), Step 807 then selects (at least) one component with most desirable benefit-cost combination as the next target for identification. One example of desirable combination is the one with the highest benefit-cost ratio. Afterwards, Step 809 computes a proper deployment (e.g., the minimum-cost deployment) to identify all links in the targeted component. Links in this component are added to the identifiable set, and newly added monitors to the deployment set, respectively. With the knowledge of link metrics in one component, all nodes connecting this component to other components effectively turn into "monitors," since within this component, all link combinations constituting part of a measurement path are computable and can be deducted from an end-to-end measurement. Thus, the costs for identifying the neighboring components of an identified component are changed accordingly, which is shown in step 809 as updating the costs. The benefits of each component are updated as well (these may be separately updated and/or updated as a ratio). This can model cases where knowledge of a link can be used to infer metrics of adjacent links using spatial correlation, thus reducing the benefit of separately identifying the adjacent links. Step 811 repeats steps 805-809 until the budget limit is reached.

Figure 9:
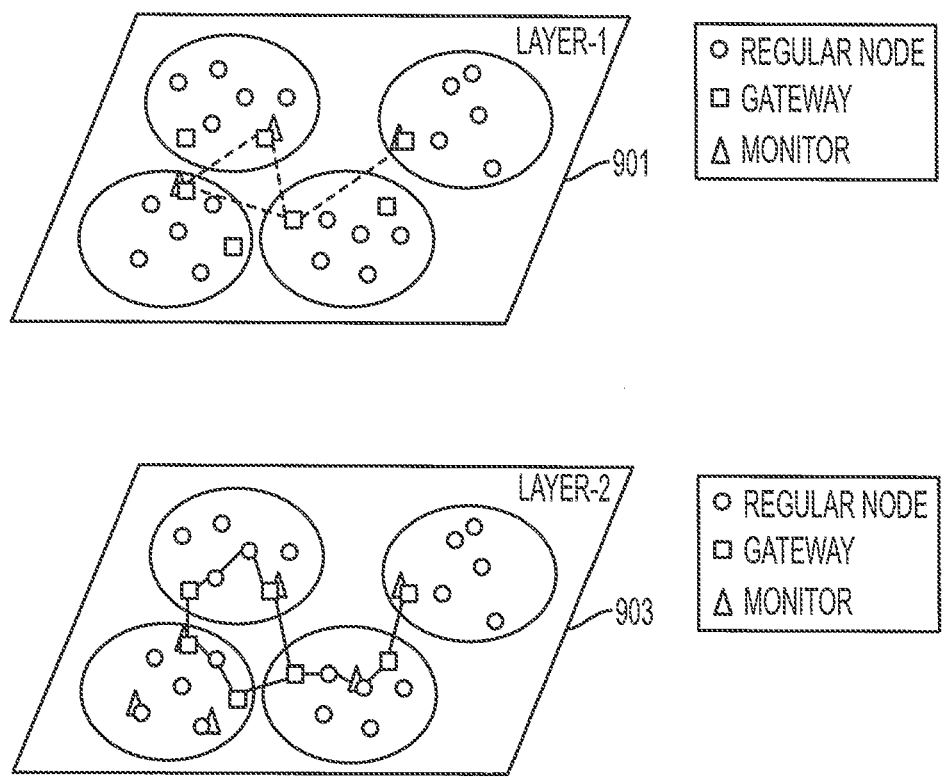
FIG. 9 depicts a block diagram of an example overlay network 901 and an example overlay network 903 according to an embodiment of the present invention.

Referring now to FIG. 9, another diagram related to the multi-resolution deployment of the first embodiment is shown. As seen in this FIG., in this example there is overlay network layer-1 (call-out number 901) and overlay network layer-2 (call-out number 903) (in one example, one way to generate two overlays is to group multiple subnetworks (e.g., four of them in 901) into a single "node" and hence generate an overlay one level above 901). For each overlay network layer-k (k=1, 2, . . . until the physical network), compute the minimum number of monitors to identify the network overlay layer-k's links (in one specific example, this may be done using the techniques in "Topological conditions for identifying additive link metrics via end-to-end path measurements," L. Ma, T. He, K. K. Leung, D. Towsley, and A. Swami mentioned above). If the remaining number of monitors is sufficient, deploy monitors and continue with layer k+1, Otherwise, go to "partial deployment" (see element 709 of FIG. 7 discussed above, FIG. 8 discussed above, and the additional details discussed below).

More particularly, such partial deployment may sequentially deploy monitors to maximize improvement in the number of identifiable links for each monitor (using, e.g., a minimum uncertainty process).

In one specific example, the method may operate as follows. For all (sub)networks subject to partial deployment (for example, for all (sub)networks in the first layer of overlay network (moving down towards the physical layer) that cannot be fully identified): (1) decompose each (sub) network into triconnected components (because 3-connectivity is sufficient for identifiability using 3 monitors); (2) compute the benefit-cost ratio for each component (benefit: increase in number of identifiable links; cost: number of monitors needed); (3) select the component with the highest benefit-cost ratio to deploy monitors; (4) update the benefit-cost ratio of neighboring components; (5) repeat steps 3-4 until reaching the budget (the number of monitors needed may be reduced, as the connecting point(s) with identifiable component(s) also serve as "monitors"—see (configuration (a) and configuration (b) of FIGS. 10A and 10B).

As described herein, the issue of partial deployment is basically to "select a set of items (placement locations) to maximize the total value (number of identifiable links)". One method to make the selection is a greedy heuristic (discussed above). In other examples, other methods can be applied, e.g., brute-force combinatorial optimization.

Figure 11:
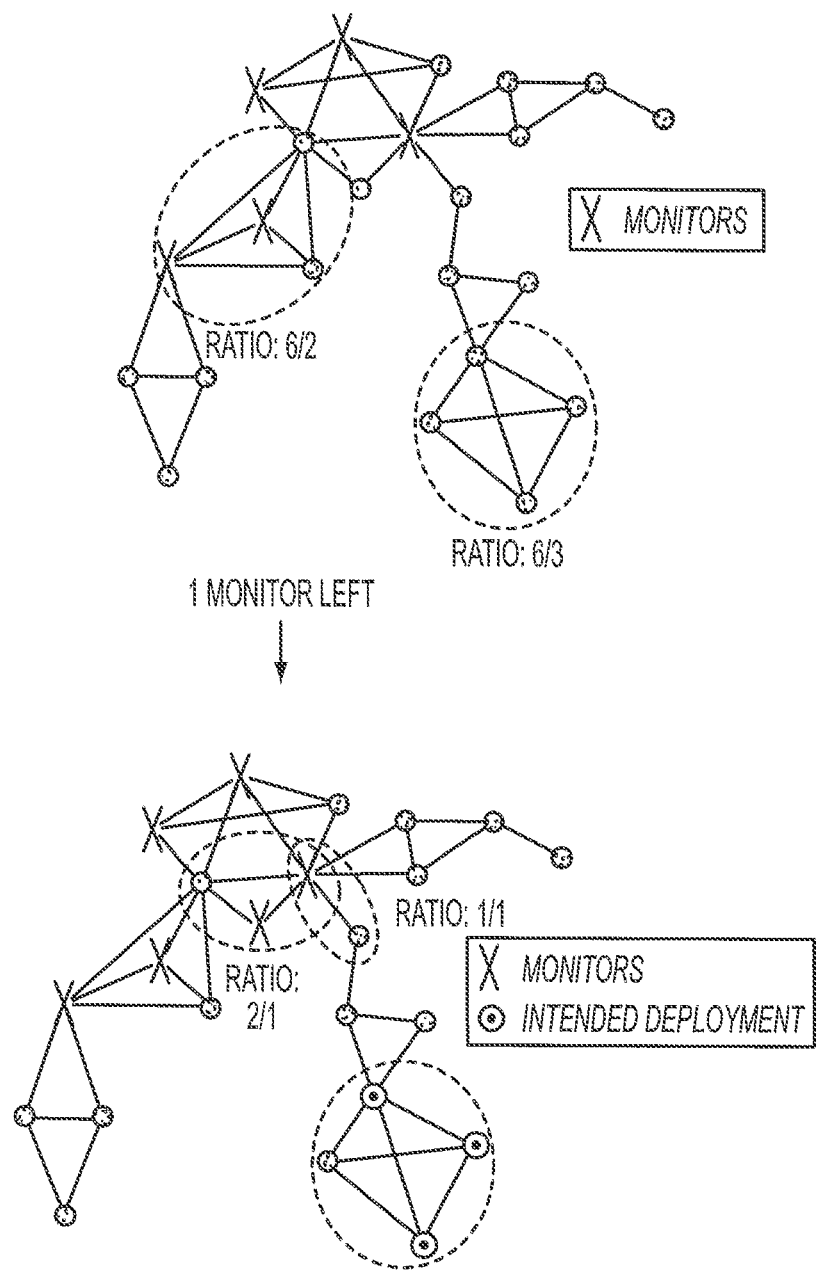
FIG. 11 depicts an example of network topography according to an embodiment of the present invention.

In another example, partial deployment (e.g., with respect to being towards the end of budget) may be performed as follows: (a) if the remaining budget is not enough for the component with the highest benefit-cost ratio, reselect component to maximize the benefit-cost ratio while staying within the remaining budget (see configuration (a) and configuration (b) of FIG. 11); (b) if no more components can be identified, randomly select a neighbor of an identified component.

Figure 12:
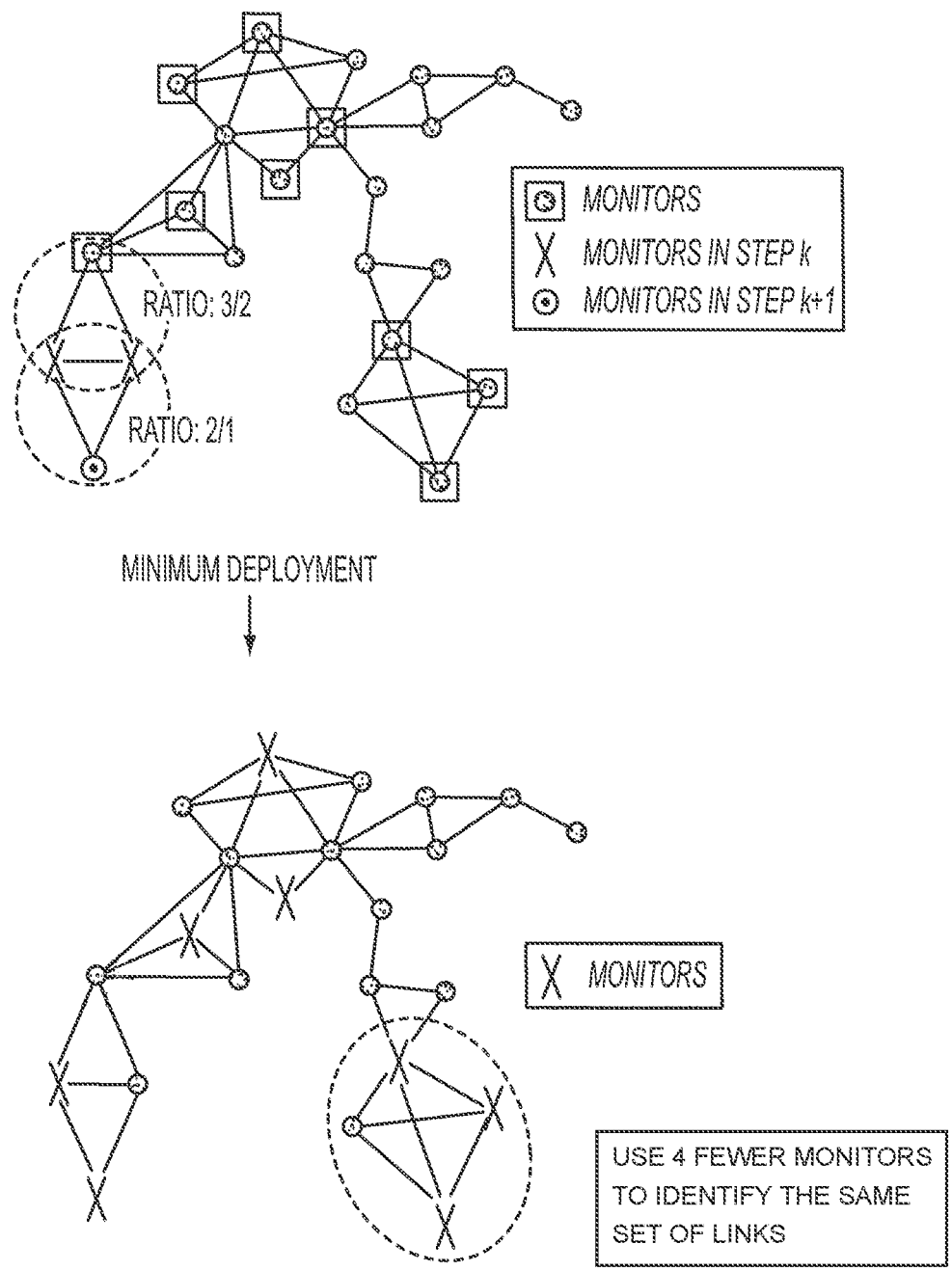
FIG. 12 depicts an example of network topography according to an embodiment of the present invention.

In another example, partial deployment (e.g., with respect to optimizing the deployment result to improve efficiency) may be performed as follows: (a) the first run of the method may deploy redundant monitors (see FIG. 12); (b) redundancy can be removed by: (1) run the minimum monitor deployment algorithm on the identified subnetworks; (2) rerun selective monitor deployment, with the partially identified network as input, and the remaining number of monitors as budget; (c) the above can be repeated (as seen, the redundant monitors are the ones deselected after running "minimum deployment algorithm").

In another example, partial deployment may be performed as follows (allowing general cost/weight): The method can be extended to support general deployment cost at each location, and general weight of each (overlay) link that indicates the value of the knowledge about this link.

Reference will now be made to a number of supporting methods for minimum-uncertainty deployment. More particularly, reference will first be made to "backtracking." MMP implies that the placement of monitors for complete network identification is not unique, i.e., one monitor might have multiple potential locations while the property of complete identification in the associated network still exists. Therefore, in addition to resolution refinement following the top-to-bottom direction, backward tracking can also be employed to further improve the budget efficiency.

To utilize backward tracking, considered are the deployed monitors associating with some flexible locations for link identifications in the upper layer when computing the identification cost of the current (lower) layer. Based on this newly computed identification cost, if the current layer (or targeted component) can be identified with the aid of adjusting some location-flexible monitors in the upper layer, then these location-flexible monitors can be restricted to a smaller set of locations determined by a monitor adjustment scheme in the current (lower) layer, thus further saving the limited monitor budget.

Still referring to supporting methods for minimum-uncertainty deployment, reference will now be made to "combinatorial optimization—optimizing existing monitor deployment." Given the fact that redundant monitors might be deployed to identify adjacent triconnected components when re-executing, for example, steps 805, 807 and 809 in FIG. 8, the following subroutine for step 809 to remove these redundancies may be used: Run the MMP algorithm on the identified sub-networks in the current layer to determine the minimum monitor requirement and the corresponding monitor placement; if there exist redundant monitors for these identified sub-networks, then remove them and add them back to the budget.

Figure 10A:
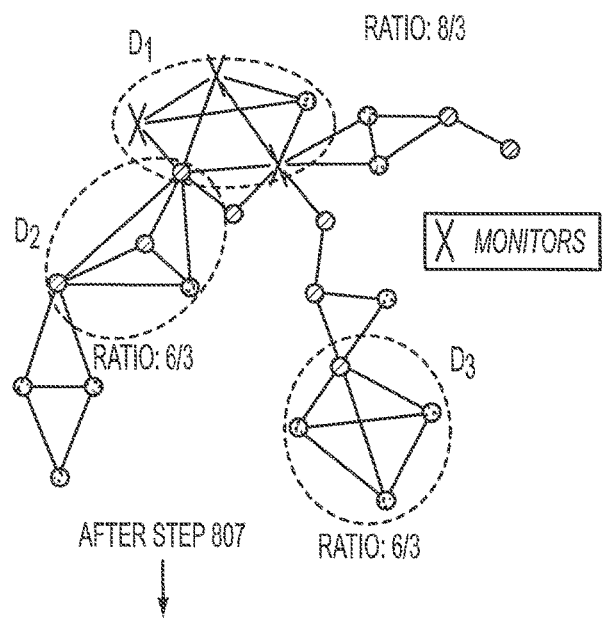
FIG. 10A depicts an example network topography for explaining a benefit-cost ratio calculation according to an embodiment of the present invention.
Figure 10B:
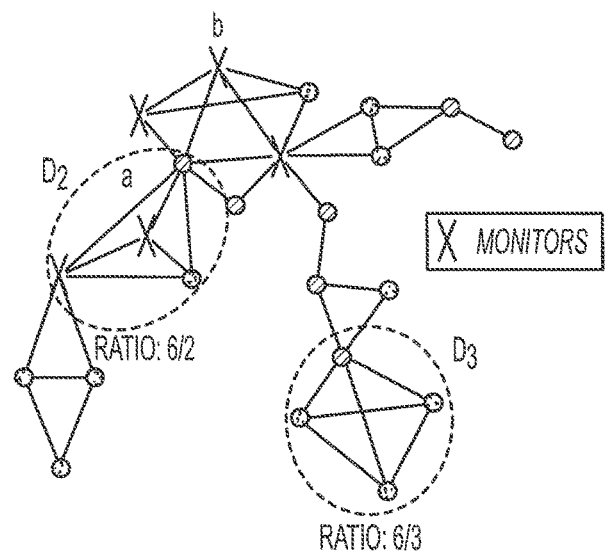
FIG. 10B depicts an example network topography for explaining an update of benefit-cost ratio according to an embodiment of the present invention.

Still referring to FIG. 10A, suppose all link metrics are not identified by previous operations and no monitors have been employed in it, then the benefit cost ratio for D1, D2 and D3 are 8/3, 6/3 and 6/3, respectively. Therefore, D1 with the highest benefit cost ratio is selected as the targeted component in step 807 of FIG. 8. Next, with this new monitor deployment, identifiable set and deployment set are both updated in step 809 of FIG. 8. Most importantly, the benefit cost ratios in neighboring triconnected components are updated, example, (b) is do effective monitor after step 807; therefore, the benefit cost ratio for D2 is increased to 6/2 since only 2 additional monitors are required to identify all link metrics in D2. Thus, after selecting D1 in (a), the next targeted component should be D2 which has the highest updated benefit-cost ratio.

After deploying all monitors with the limited budget, Spanning Tree-based Path Measurement (see L. Ma, T. He, K. K. Leung, D. Towsley, and A. Swami, "Topological conditions for identifying additive link metrics via end-to-end path measurements," submitted to INFOCOM 2013) algorithm for constructing measurement paths can be employed to take real path measurements between monitors in the associated network/sub-network/overlay-layer.

Still referring to supporting methods for minimum-uncertainty deployment, reference will now be made to "insufficient budget for one component." There might not be enough remaining budget for identifying the component with the highest benefit-cost ratio towards the end of budget, e.g., 2 additional monitors are required to identify the targeted component; however, only one monitor is left in the remaining budget. In this case (which only happens when the number of remaining monitors is 1 or 2 since one triconnected component needs 3 new monitors at most), the following operations may be performed: reselect the component with the maximum benefit-cost ratio subject to the remaining budget; if no more components can be completely identified, then randomly select a neighbor of an identified component.

Another method to solve this insufficient budget issue is to consider identifying the interior graph of a biconnected component using two monitors (interior graph of a graph G is the remaining graph after removing the monitors and their adjacent links) (see, Topological conditions for identifying additive link metrics via end-to-end path measurements," L. Ma, T. He, K. K. Leung, D. Towsley, and A. Swami). Through dedicated monitor planning, if the biconnected component with 2 (effective) monitors satisfies the identification conditions in this cited document, then the links in the interior graph are identifiable even though the full identification of the biconnected component requires 3 (or more) monitors.

As described herein are mechanisms to selectively deploy monitors at nodes in different parts of a network (e.g., sub-networks) to identify internal states at different locations: horizontal partition (this may maximize size of identifiable parts within budget).

One method is to iteratively: select the component w/highest benefit-cost ratio; deploy monitors to identify links in this component with minimum cost; update the cost of neighboring components by considering their connecting points as "monitors"; repeat the above until reaching the budget limit As described herein, it has been assumed that the budget for all the operations in selective monitor deployment is the number of monitors. In other examples, the budget can be extended to a general cost to incorporate other factors, e.g., time and complexities of the deployment. Similarly, the budget may be generalized to constrain such deployment cost. Furthermore, the "benefit" can also be extended from the number of identified links to include other factors, e.g., value of knowing the metrics of various links. To this end, the "cost" and "benefit" can be defined to include other possible factors in addition to the number of monitors/links. The rest of the techniques may follow as before, e.g., the benefit/cost of each component is updated according to the desired definition when selecting the targeted component. Note that with this extended definition of benefit/cost, the vertical partition of a network might be changed to reflect the new priorities among links.

Figure 13:
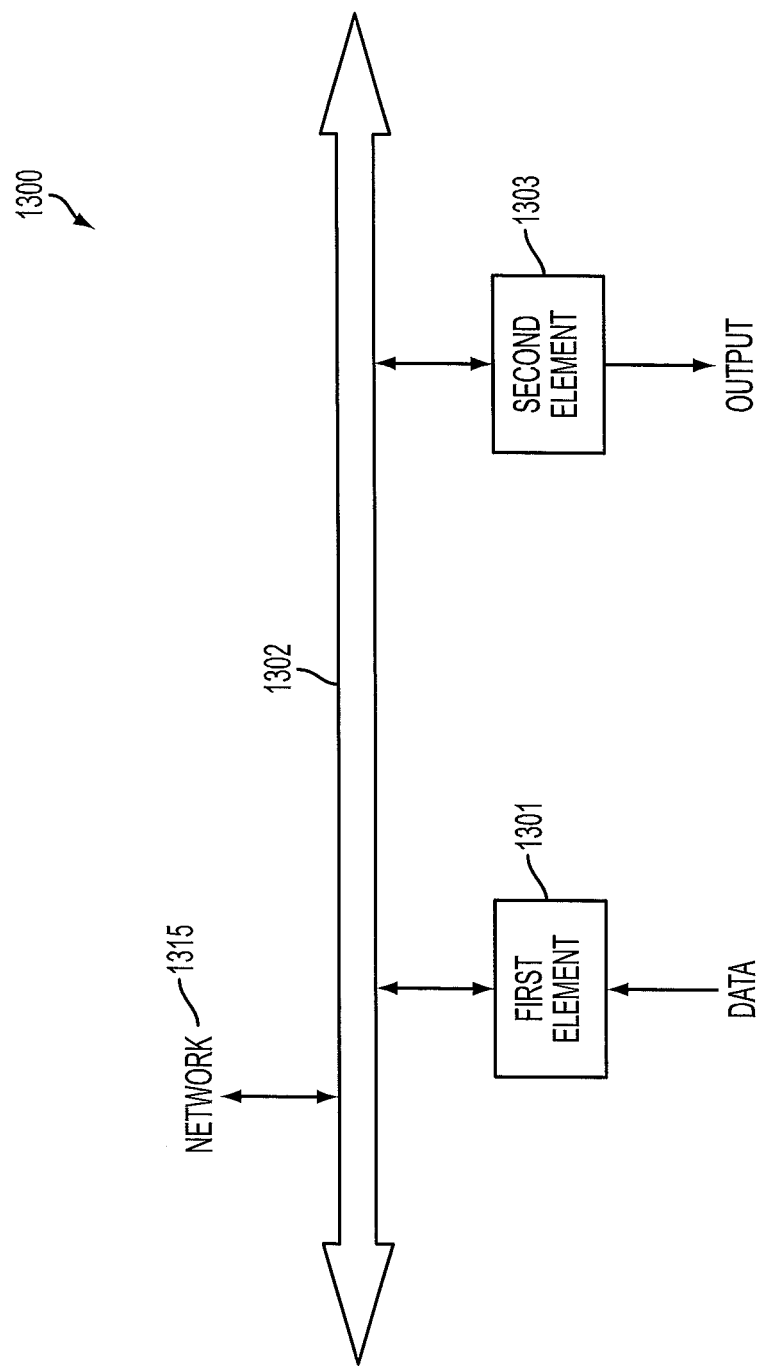
FIG. 13 depicts a block diagram of a system according to an embodiment of the present invention.

Referring now to FIG. 13, in another embodiment a system 1300 for selective monitor deployment under budget constraints is provided. This system may include the following elements: a first element 1301 configured to obtain a network topology, a structure of a plurality of layers of an overlay network of monitoring interest, and a deployment budget as an input; and a second element 1303 configured to, from a top layer of the overlay network towards a bottom layer of the overlay network: determine a minimum deployment cost to fully identify links in a current layer of the overlay network; wherein, if the determined minimum deployment cost is no more than a remaining portion of the deployment budget: then output an indication of monitor deployment so that the current layer of the overlay network is identified with the minimum deployment cost, reduce the remaining portion of the deployment budget, and go to the next layer; otherwise, output an indication of monitor deployment within the remaining portion of the deployment budget so as to identify a fraction of link metrics of the overlay network.

Still referring to FIG. 13, each of the elements may be operatively connected together via system bus 1302. In one example, communication between and among the various elements may be bi-directional. In another example, communication may be carried out via network 1315 (e.g., the Internet, an intranet, a local area network, a wide area network and/or any other desired communication channel(s)). In another example, some or all of these elements may be implemented in a computer system of the type shown in FIG. 15.

Figure 14:
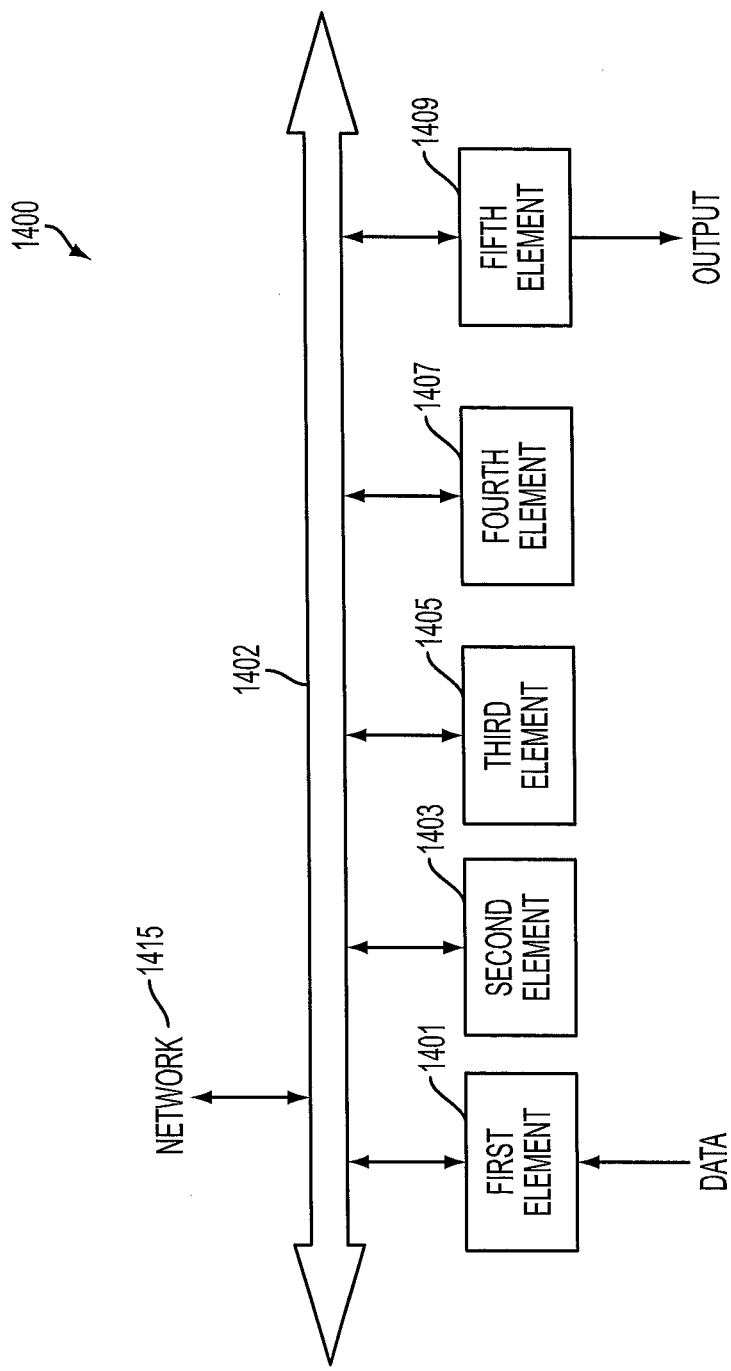
FIG. 14 depicts a block diagram of a system according to an embodiment of the present invention.

Referring now to FIG. 14, in another embodiment a system 1400 for selective monitor deployment under budget constraints is provided. This system may include the following elements: a first element 1401 configured to obtain a network topology and a deployment budget; a second element 1403 configured to decompose the network topology into a plurality of components having a predetermined property; a third element 1405 configured to compute a benefit and a cost for identifying each of the components; a fourth element 1407 configured to select at least one targeted component based on the benefit and the cost for identifying each of the components; and a fifth element 1409 configured to output an indication of monitor deployment to identify links in the at least one targeted component within a remaining portion of the deployment budget.

Still referring to FIG. 14, each of the elements may be operatively connected together via system bus 1402. In one example, communication between and among the various elements may be bi-directional. In another example, communication may be carried out via network 1415 (e.g., the Internet, an intranet, a local area network, a wide area network and/or any other desired communication channel(s)). In another example, some or all of these elements may be implemented in a computer system of the type shown in FIG. 15.

Figure 15:
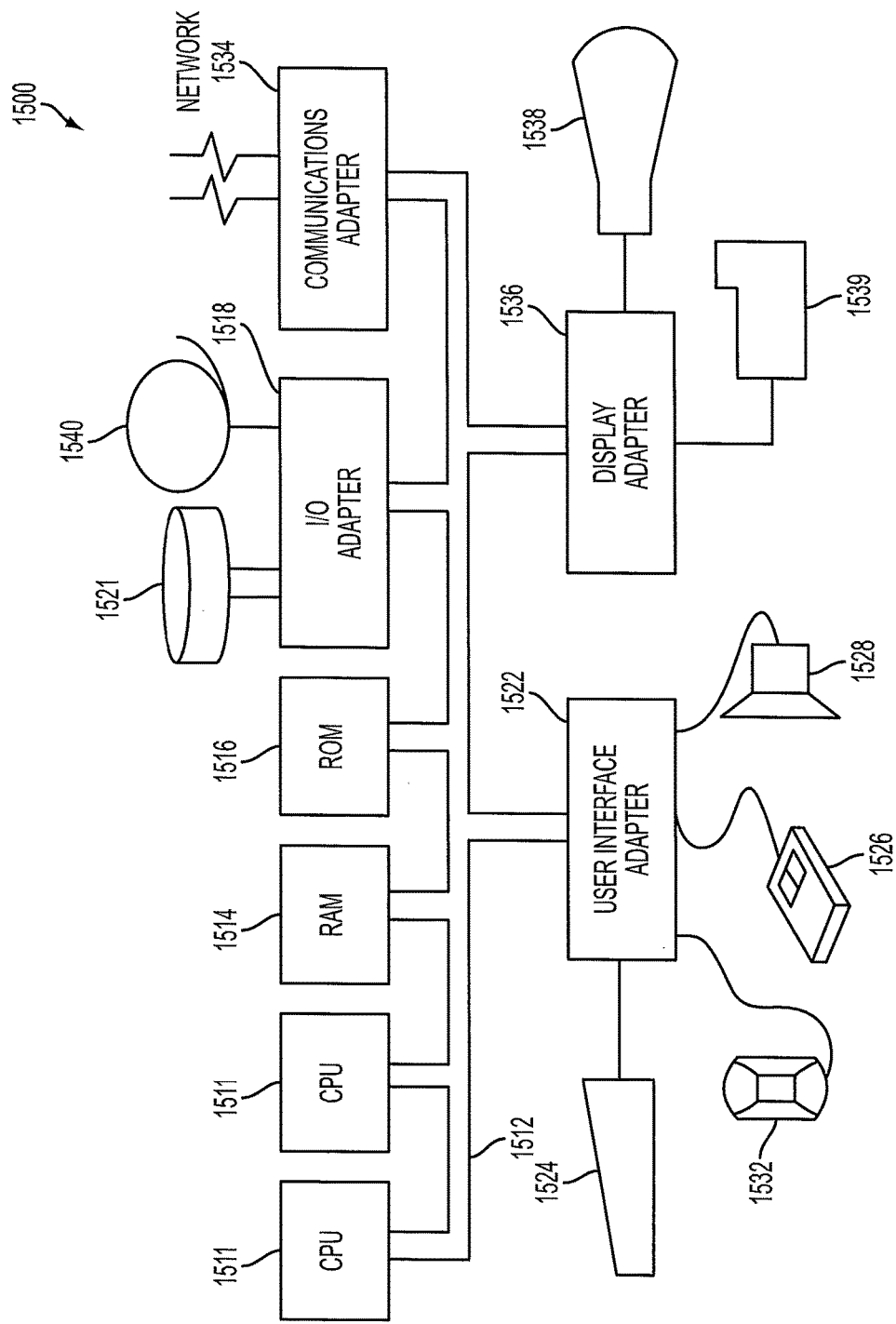
FIG. 15 depicts a block diagram of a system according to an embodiment of the present invention.

Referring now to FIG. 15, this figure shows a hardware configuration of computing system 1500 according to an embodiment of the present invention. As seen, this hardware configuration has at least one processor or central processing unit (CPU) 1511. The CPUs 1511 are interconnected via a system bus 1512 to a random access memory (RAM) 1514, read-only memory (ROM) 1516, input/output (I/O) adapter 1518 (for connecting peripheral devices such as disk units 1521 and tape drives 1540 to the bus 1512), user interface adapter 1522 (for connecting a keyboard 1524, mouse 1526, speaker 1528, microphone 1532, and/or other user interface device to the bus 1512), a communications adapter 1534 for connecting the system 1500 to a data processing network, the Internet, an Intranet, a local area network (LAN), etc., and a display adapter 1536 for connecting the bus 1512 to a display device 1538 and/or printer 1539 (e.g., a digital printer or the like).

In one embodiment, a method of selective monitor deployment under budget constraints is provided, the method comprising: obtaining a network topology, a structure of an overlay network having a plurality of layers of monitoring interest, and a deployment budget; and from a top layer of the overlay network towards a bottom layer of the overlay network: computing a minimum deployment cost to fully identify links in a current layer of the overlay network; if the computed minimum deployment cost is no more than a remaining portion of the deployment budget: then deploying monitors so that the current layer of the overlay network is identified with the minimum deployment cost, reducing the remaining portion of the deployment budget, and going to the next layer; otherwise, deploying monitors within the remaining portion of the deployment budget so as to identify a fraction of link metrics of the current layer of the overlay network.

In one example, the selective monitor deployment under budget constraints is for multi-resolution network monitoring using end-to-end probes between monitors.

In another example, the obtaining comprises partitioning the network topology to obtain the plurality of overlay network layers.

In another example, the obtaining comprises obtaining information of cost at each of a plurality of monitor deployment locations.

In another example, the obtaining comprises obtaining weights of each of a plurality of overlay network links that represent their monitoring values.

In another example, the deploying monitors within the remaining portion of the deployment budget so as to identify a fraction of link metrics of the overlay network comprises: decomposing the network topology into a plurality of components having a predetermined property; computing a benefit and a cost for identifying each of the components; selecting at least one targeted component based on the benefit and the cost for identifying each of the components; and deploying monitors to identify links in the at least one targeted component within the remaining portion of the deployment budget.

In another example, the method further comprises iterating through each layer of the overlay network multiple times.

In another example, monitor deployment in a lower layer results in recommending adjustments of monitor deployment in an upper layer so as to reduce the overall deployment cost.

In another embodiment, a method of selective monitor deployment under budget constraints is provided, the method comprising: obtaining a network topology and a deployment budget; decomposing the network topology into a plurality of components having a predetermined property; computing a benefit and a cost for identifying each of the components; selecting at least one targeted component based on the benefit and the cost for identifying each of the components; and deploying monitors to identify links in the at least one targeted component within a remaining portion of the deployment budget.

In one example, the selective monitor deployment under budget constraints is for minimum-uncertainty network monitoring using end-to-end probes between monitors.

In another example, the obtained network topology is the topology of a first layer of an overlay network that is not fully identifiable.

In another example, the deployment budget is a residual budget after deployment at higher layers of the overlay network.

In another example, the method further comprises obtaining additional information including existing monitor deployment, cost of each deployment location, and weight of each network link.

In another example, the predetermined property is that each component is independently identifiable with the least possible deployment cost.

In another example, the predetermined property is that each component is a triconnected component of the network topology.

In another example, the benefit is measured by a total number of links in a given component.

In another example, the benefit is measured by a total weight of links in a given component.

In another example, the cost is measured by the minimum deployment cost for identifying all links in a given component.

In another embodiment, a computer readable storage medium, tangibly embodying a program of instructions executable by the computer for selective monitor deployment under budget constraints is provided, the program of instructions, when executing, performing the following steps: obtaining a network topology, a structure of an overlay network having a plurality of layers of monitoring interest, and a deployment budget; and from a top layer of the overlay network towards a bottom layer of the overlay network: computing a minimum deployment cost to fully identify links in a current layer of the overlay network; if the computed minimum deployment cost is no more than a remaining portion of the deployment budget: then deploying monitors so that the current layer of the overlay network is identified with the minimum deployment cost, reducing the remaining portion of the deployment budget, and going to the next layer; otherwise, deploying monitors within the remaining portion of the deployment budget so as to identify a fraction of link metrics of the overlay network.

In another embodiment, a computer readable storage medium, tangibly embodying a program of instructions executable by the computer for selective monitor deployment under budget constraints is provided, the program of instructions, when executing, performing the following steps: obtaining a network topology and a deployment budget; decomposing the network topology into a plurality of components having a predetermined property; computing a benefit and a cost for identifying each of the components; selecting at least one targeted component based on the benefit and the cost for identifying each of the components; and deploying monitors to identify links in the at least one targeted component within a remaining portion of the deployment budget.

In other examples, any steps described herein may be carried out in any appropriate desired order.

As described herein are mechanisms for strategically placing monitors under a given deployment budget.

As described herein are mechanisms for optimizing monitoring performance (e.g., monitor deployment under budget constraint).

As described herein are mechanisms for judicious selection of monitors nodes to support network tomography-based monitoring where network internal state (link metrics) are inferred from external observation (E2E (end-to-end) probes).

As described herein, various embodiments make use of the observation that end-to-end probing naturally gives aggregated information. The network can be properly partitioned into multiple layers/sub-networks so that monitor deployment can be prioritized while optimizing overall performance. Various examples comprise the following two parts: (1) Deployment based on vertical partition: The original network is partitioned into multiple layers (overlay network), with each layer representing an identification priority and a unique resolution. The identification starts from the top layer towards the bottom layer with each layer generating a better resolution; and/or (2) Deployment based on horizontal partition: If the remaining budget is insufficient to identify all link metrics in the current layer, then the current layer is further partitioned into sub-networks with certain properties (e.g., 3-vertex-connected components), where the sub-networks with the maximum number of unknown links and the minimum deployment cost are first selected as the sub-networks to identify.

Various described monitor deployment mechanisms provide the ability to identify the most crucial network states (e.g., overlay links) first and then to sequentially identify the remaining network states such that multi-resolution, minimum-uncertainty monitoring of internal network states under flexible monitor budget can be provided. The monitor deployment for each layer/sub-network can leverage any method for complete identification, e.g., the Minimum Monitor Placement (MMP) algorithm in (L. Ma, T. He, K. K. Leung, D. Towsley, and A. Swami, "Topological conditions for identifying additive link metrics via end-to-end path measurements," submitted to INFOCOM 2013). Another application scenario is sequential deployment, where the solution can be used to prioritize deployments while successively refining the resolution when additional deployment budget becomes available.

As described herein (and for illustrative purposes), the limited budget has sometimes been simplified to a finite number of monitors The number of monitors in the budget should be greater than 3 since any network with more than 1 link cannot be identified using only 2 monitors to measure simple paths (see L. Ma, T. He, K. K. Leung, D. Towsley, and A. Swami, "Topological conditions for identifying additive link metrics via end-to-end path measurements," submitted to INFOCOM 2013), which are insufficient to identify all link metrics in the given network topology. Of course, the limited budget may be extended to cover more general cases. In other examples, real routing restrictions may be considered (in various examples herein all measurement paths between monitors are constrained to simple paths (paths not containing any cycles)).

As discussed above, the network may first be vertically partitioned into multiple layers so as to form an overlay network (vertical partition is not required if the number of layers is only one), with each layer representing an identification priority and a unique resolution. In this overlay structure, only the bottom layer is the original physical network, whereas links in other layers are logical links possibly consisting of more than one physical link from the original network. Therefore, among these prioritized layers, the higher layer has a relatively low resolution compared with the lower layers; nevertheless, logical link identifications of higher layers can provide a rough picture of network internal states using the limited budget, thus serving as an ensured-identification basis to the budget-constrained monitoring task. In essence, the strategy starts at the top layer to achieve an initial rough internal state identification. Afterwards, if any remaining budget exists, the next layer is identified to achieve a finer resolution. The process of this sequential resolution refining is repeated until depleting all budgets to finally obtain a best-effort resolution.

As described herein, a challenge in applying network tomography in real monitoring systems is the lack of identifiability. Specifically, it is not guaranteed that all link metrics are identifiable for a network with arbitrary monitor deployment (see B. Xi, G. Michailidis, and V. N. Nair, "Estimating network loss rate using active tomography," Theory and Methods, vol. 101, no. 476, December 2006). The reason is that many measurement paths between monitors are linearly dependent in that some paths are linear combinations of the rest, and hence their measurements do not provide new information. Recent studies (see Y. Chen, D. Bindel, H. Song, and R. Katz, "An algebraic approach to practical scalable overlay network monitoring," SIGCOMM 2004) suggest that only $O(m \cdot \log m)$ out of $O(m^2)$ paths are linearly independent for a network with m monitors. Therefore, it is important to carefully plan the location and the number of monitors for a given network topology. Various embodiments disclosed herein provide for such planning of the location and the number of monitors for a given network topology.

As described herein, various embodiments may operate in the context of fixed, mobile and/or wireless networking.

As described herein, various embodiments may operate in the context of: computer system management; converged communications and/or network equipment.

As will be appreciated by one skilled in the art, aspects of the present invention may be embodied as a system, method or computer program product. Accordingly, aspects of the present invention may take the form of an entirely hardware embodiment, an entirely software embodiment (including firmware, resident software, micro-code, etc.) or an embodiment combining software and hardware aspects that may all generally be referred to herein as a "circuit," "module" or "system." Furthermore, aspects of the present invention may take the form of a computer program product embodied in one or more computer readable medium(s) having computer readable program code embodied thereon.

Any combination of one or more computer readable medium(s) may be utilized. The computer readable medium may be a computer readable signal medium or a computer readable storage medium. A computer readable storage medium may be, for example, but not limited to, an electronic, magnetic, optical, electromagnetic, infrared, or semiconductor system, apparatus, or device, or any suitable combination of the foregoing. More specific examples (a non-exhaustive list) of the computer readable storage medium would include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a magnetic storage device, or any suitable combination of the foregoing. In the context of this document, a computer readable storage medium may be any tangible medium that can contain, or store a program for use by or in connection with an instruction execution system, apparatus, or device.

A computer readable signal medium may include a propagated data signal with computer readable program code embodied therein, for example, in baseband or as part of a carrier wave. Such a propagated signal may take any of a variety of forms, including, but not limited to, electro-magnetic, optical, or any suitable combination thereof. A computer readable signal medium may be any computer readable medium that is not a computer readable storage medium and that can communicate, propagate, or transport a program for use by or in connection with an instruction execution system, apparatus, or device.

Program code embodied on a computer readable medium may be transmitted using any appropriate medium, including but not limited to wireless, wireline, optical fiber cable, RF, etc., or any suitable combination of the foregoing.

Computer program code for carrying out operations for aspects of the present invention may be written in any programming language or any combination of one or more programming languages, including an object oriented programming language such as Java, Smalltalk, C++ or the like or a procedural programming language, such as the "C" programming language or similar programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

Aspects of the present invention may be described herein with reference to flowchart illustrations and/or block diagrams of methods, systems and/or computer program products according to embodiments of the invention. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

These computer program instructions may also be stored in a computer readable medium that can direct a computer, other programmable data processing apparatus, or other devices to function in a particular manner, such that the instructions stored in the computer readable medium produce an article of manufacture including instructions which implement the function/act specified in the flowchart and/or block diagram block or blocks.

The computer program instructions may also be loaded onto a computer, other programmable data processing apparatus, or other devices to cause a series of operational steps to be performed on the computer, other programmable apparatus or other devices to produce a computer implemented process such that the instructions which execute on the computer or other programmable apparatus or other devices provide processes for implementing the functions/acts specified in the flowchart and/or block diagram block or blocks.

The flowcharts and block diagrams in the figures illustrate the architecture, functionality, and operation of possible implementations of systems, methods and computer program products according to various embodiments of the present invention. In this regard, each block in the flowcharts or block diagrams may represent a module, segment, or portion of code, which comprises one or more executable instructions for implementing the specified logical function(s). It should also be noted that, in some implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustrations, and combinations of blocks in the block diagrams and/or flowchart illustrations, can be implemented by special purpose hardware-based systems that perform the specified functions or acts, or combinations of special purpose hardware and computer instructions.

It is noted that the foregoing has outlined some of the objects and embodiments of the present invention. This invention may be used for many applications. Thus, although the description is made for particular arrangements and methods, the intent and concept of the invention is suitable and applicable to other arrangements and applications. It will be clear to those skilled in the art that modifications to the disclosed embodiments can be effected without departing from the spirit and scope of the invention. The described embodiments ought to be construed to be merely illustrative of some of the features and applications of the invention. Other beneficial results can be realized by applying the disclosed invention in a different manner or modifying the invention in ways known to those familiar with the art. In addition, all of the examples disclosed herein are intended to be illustrative, and not restrictive.

What is claimed is:

1. A method of performing monitor deployment under budget constraints, wherein the method implemented in a computer system, comprising:
    obtaining, using at least one processor coupled to the computer system, a network topology and a deployment budget;
    decomposing, using the at least one processor, the network topology into a plurality of components having a predetermined property;
    computing, using the at least one processor, a benefit and a cost for identifying each of the components;
    selecting using the at least one processor at least one targeted component based on a ratio of the benefit to the cost for identifying each of the components; and
    deploying using the at least one processor monitors to identify links in the at least one targeted component within a remaining portion of the deployment budget
    wherein the deployment budget is a residual budget after deployment at other layers than the first layer in the overlay network.

2. The method of claim 1, wherein the obtained network topology is the topology of a first layer of an overlay network that is not fully identifiable, and
    wherein the deployment budget is a residual budget after deployment at other layers than the first layer in the overlay network.

3. The method of claim 1, further comprising obtaining additional information including existing monitor deployment, cost of each deployment location, and weight of each network link.

4. The method of claim 1, wherein the predetermined property is that each component is independently identifiable with a least possible deployment cost.

5. The method of claim 1, wherein the predetermined property is that each component is a triconnected component of the network topology.

6. The method of claim 1, wherein the benefit comprises a total number of links in a given component.

7. The method of claim 1, wherein the benefit comprises a total weight of links in a given component.

8. The method of claim 1, wherein the cost comprises a number of monitors required for identifying all links in a given component.

9. The method of claim 1, wherein the ratio of the benefit to the cost comprises a ratio of a number of identifiable links in a given component to a number of monitors required for identifying all links in the given component.

10. The method of claim 1, wherein the selecting at least one targeted component based on a ratio of the benefit to the cost for identifying each of the components comprises:
    selecting a first component of the plurality of components, the first component having a higher ratio of the benefit to the cost than a respective ratio of the benefit to the cost of other components of the plurality of components.

11. The method of claim 10, further comprising: updating a ratio of the benefit to the cost of neighboring component of the first component.

12. A non-transitory computer readable storage medium, tangibly embodying a program instructions executable by at least one computer processor, the program instructions cause the at least one computer processor to perform a method for performing monitor deployment under budget constraints, wherein the method comprises:
  obtaining a network topology and a deployment budget;
  decomposing the network topology into a plurality of components having a predetermined property;
  computing a benefit and a cost for identifying each of the components; selecting at least one targeted component based on a ratio of the benefit to the cost for identifying each of the components; and
  deploying monitors to identify links in the at least one targeted component within a remaining portion of the deployment budget
  wherein the deployment budget is a residual budget after deployment at higher layers of the overlay network; and
  wherein the medium is not a signal.

13. The storage medium of claim 12, wherein the obtained network topology is the topology of a first layer of an overlay network that is not fully identifiable, and
  wherein the deployment budget is a residual budget after deployment at other layers than first layer in the overlay network.

14. A computer system for performing monitor deployment under budget constraints, comprising:
  a memory device storing machine executable instructions; and
  at least one processing device coupled to the memory device, the at least one processing device configured to run the machine executable instructions to perform:
  obtaining a network topology and a deployment budget;
  decomposing the network topology into a plurality of components having a predetermined property;
  computing a benefit and a cost for identifying each of the components,
  selecting at least one targeted component based on a ratio of the benefit to the cost for identifying each of the components; and
  deploying monitors to identify links in the at least one targeted component within a remaining portion of the deployment budget
  wherein the deployment budget is a residual budget after deployment at other layers than the first layer in the overlay network.

* * * * *